W. R. JOHNSON.
DECOY.
APPLICATION FILED DEC. 6, 1911.

1,062,713.

Patented May 27, 1913.

Witnesses
James E. Sproll.
Clara Harm.

Inventor
William R. Johnson.
By Adams & Brooks
Attorneys

UNITED STATES PATENT OFFICE.

WILLIAM R. JOHNSON, OF SEATTLE, WASHINGTON.

DECOY.

1,062,713.

Specification of Letters Patent.

Patented May 27, 1913.

Application filed December 6, 1911. Serial No. 664,266.

*To all whom it may concern:*

Be it known that I, WILLIAM R. JOHNSON, a citizen of the United States of America, and a resident of the city of Seattle, in the county of King and State of Washington, have invented certain new and useful Improvements in Decoys, of which the following is a specification.

My invention relates to improvements in decoy ducks such as are employed by sportsmen when duck hunting to attract the attention of wild ducks and entice them to alight upon the surface of water within range of their guns, and the object of my invention is to provide an excellent image of a wild duck the plan of construction of which image may adapt it to be folded into a compact flat package that conveniently may be carried in the pocket of a sportsman's jacket and which may be constructed at a small cost of labor and material and further, which shall be water proof and durable. I attain this object by devices illustrated in the accompanying drawings whereby their plan of construction and mode of employment will be understood clearly.

Figure 1:
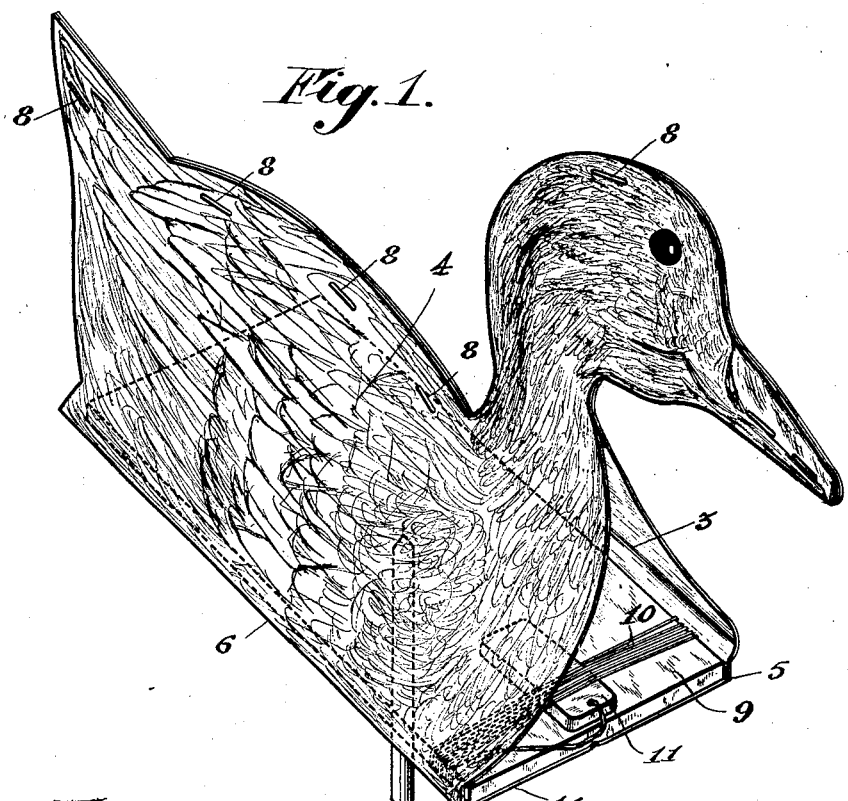
Figure 2:
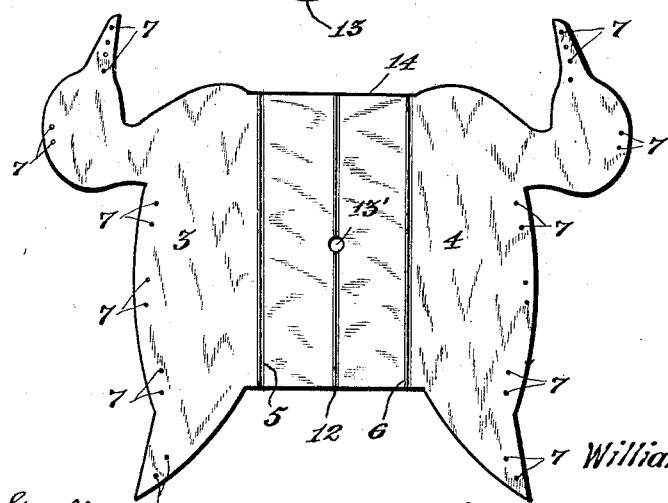

Figure 1 of the drawing is a perspective view of a decoy duck embodying my invention wherein portions of some parts thereof are indicated by dotted lines, while Fig. 2 is a diagrammatic representation of a plan or shape into which material is cut in the process of making a decoy duck containing my invention.

Like numerals of reference indicate like parts throughout the drawing.

In Fig. 2 of the drawings there is shown, on a reduced scale, the shape into which is cut material like cardboard or straw-board which is flexible and adapted to be folded and which material is made water proof by coating it or saturating it with some preparation which shall make it impervious to water, such as paraffin wax. Card-board thus shaped provides two side sections 3 and 4 each having a resemblance in outline of the bodies, heads, tails and bills of a duck, and a bottom section 14 connected with sections 3 and 4 by lines of fold 5 and 6. Bottom section 14 is provided with a central longitudinal score line 12 along which said bottom section is folded inwardly to collapse the decoy, as will later be understood. In practice both duck forms are bent upwardly on lines 5 and 6 toward each other and the tops of the heads and backs and the bills and tails of these forms of sections are then fastened together by wire staples or binders 8. When the cardboard has been fashioned and fastened to produce the form shown in Fig. 1 a substantially rectangular float member 9 is inserted into the same, the latter having a snug fit between side sections 3 and 4 and resting on the bottom section 14 to hold the same against inward collapsing movement. Attached to float member 9 is a cord or string 10 to the end of which is fastened a weight or anchor 11, whereby the duck form thus constructed may be anchored when placed on the surface of the water. The exposed sides of the duck image thus formed may be printed with variegated colors to closely imitate any desired species of wild duck. A decoy duck thus made in accordance with my invention, as shown and described, when not in use may be collapsed to a flat or compact form by withdrawing the member 9 and folding bottom section 14, this last named operation drawing side sections 3 and 4 together.

Reference numeral 13 indicates a pendant weight for maintaining the decoy in an upright position on the water, the same consisting, for example, of a nail which is passed through an aperture 13' of bottom section 14 and driven into member 9.

Having thus described my invention what I claim as new and desire to secure by Letters Patent of the United States of America, is:—

1. A decoy, comprising a foldable image having corresponding side walls secured together at their upper margins, open ends, and a foldable bottom connecting the lower edges of the side walls.

2. A decoy, comprising a foldable image having corresponding side walls, means securing the upper margins of the side walls directly together, and an inwardly foldable bottom connecting the lower edges of the side walls and permitting the same to lie flat alongside each other and against the infolded bottom, portions of the front and rear edges of the side walls being disconnected and separate to maintain an open passageway through the image.

3. A decoy, comprising a foldable image having side walls secured together at their upper margins, open ends, an infolding bottom connecting the lower edges of the side walls, and a float element detachably located within the body and resting upon the infolding bottom, preventing the same from folding.

4. A decoy, comprising a collapsible body, a float and sustaining member detachably located therein, and a pendant weight passing through the body and attached to the float, said weight thereby constituting means for holding the float in position.

5. A decoy, comprising a collapsible body having an open end, a float detachably located in the body and removable through the open end, an anchor having a connection with the float at the open end, and a pendent weight passing through the body and engaged with the float, thereby maintaining the same in position.

Signed at Seattle, Washington this 29th day of November 1911.

WILLIAM R. JOHNSON.

Witnesses:
 Louis T. Fossum,
 Clara A. Harm.